(12) United States Patent
Kim et al.

(10) Patent No.: US 11,032,046 B2
(45) Date of Patent: Jun. 8, 2021

(54) METHOD FOR APPLYING PRECODER ON BASIS OF RESOURCE BUNDLING IN WIRELESS COMMUNICATION SYSTEM, AND DEVICE THEREFOR

(71) Applicant: LG ELECTRONICS INC., Seoul (KR)

(72) Inventors: Hyungtae Kim, Seoul (KR); Jiwon Kang, Seoul (KR); Kijun Kim, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/495,090

(22) PCT Filed: Mar. 19, 2018

(86) PCT No.: PCT/KR2018/003171
§ 371 (c)(1),
(2) Date: Sep. 17, 2019

(87) PCT Pub. No.: WO2018/169375
PCT Pub. Date: Sep. 20, 2018

(65) Prior Publication Data
US 2020/0099488 A1 Mar. 26, 2020

Related U.S. Application Data

(60) Provisional application No. 62/473,239, filed on Mar. 17, 2017, provisional application No. 62/474,079, filed on Mar. 21, 2017.

(51) Int. Cl.
*H04L 5/00* (2006.01)
*H04B 7/0456* (2017.01)
*H04W 72/04* (2009.01)

(52) U.S. Cl.
CPC ........ *H04L 5/0048* (2013.01); *H04B 7/0456* (2013.01); *H04W 72/04* (2013.01)

(58) Field of Classification Search
CPC ..... H04L 5/0048; H04B 7/0456; H04W 72/04
See application file for complete search history.

(56) References Cited

U.S. PATENT DOCUMENTS

2011/0310831 A1* 12/2011 Bhattad ............... H04B 7/0413
370/329
2013/0121276 A1* 5/2013 Kim ..................... H04L 5/0053
370/329
(Continued)

FOREIGN PATENT DOCUMENTS

CN 103563319 2/2014
CN 104185960 12/2014
(Continued)

OTHER PUBLICATIONS

Samsung ("DMRS-based spatial multiplexing for UL NR MIMO", 3GPP TSG RAN WG1 Meeting #87, R1-1612479, Nov. 14-18, 2016) (Year: 2016).*
Huawei, HilSilicon ("UL SRS Design for CSI Acquisition and Beam Management", 3GPP TSG RAN WG1 Meeting #87, R1-1611678, Nov. 14-18, 2016) (Year: 2016).*
Samsung ("PRB bundling and precoding granularity in UL DMRS", 3GPP TSG RAN1 88, R1-1702914, Feb. 13-18, 2017) (Year: 2017).*

(Continued)

*Primary Examiner* — Chi H Phan
*Assistant Examiner* — Ji-Hae Yea
(74) *Attorney, Agent, or Firm* — Lee Hong Degerman Kang Waimey

(57) ABSTRACT

Disclosed is a method for transmitting an uplink signal by a terminal in a wireless communication system. The method comprises the steps of: transmitting multiple precoded reference signals, to each of which a precoder cyclic pattern is applied in a predetermined resource unit, to a base station; receiving, from the base station, information indicating one among the multiple precoded reference signals; and transmitting an uplink data signal and an uplink demodulation
(Continued)

reference signal to the base station by using a precoder cyclic pattern which has been applied to the indicated precoded reference signal.

8 Claims, 8 Drawing Sheets

(56) References Cited

U.S. PATENT DOCUMENTS

| | | | |
|---|---|---|---|
| 2014/0112168 A1 | 4/2014 | Chen et al. | |
| 2015/0078271 A1* | 3/2015 | Kim | H04L 5/0051 370/329 |
| 2015/0146650 A1* | 5/2015 | Ko | H04L 5/0048 370/329 |
| 2016/0301454 A1 | 10/2016 | Nayeb Nazar et al. | |

FOREIGN PATENT DOCUMENTS

| | | | |
|---|---|---|---|
| CN | 104396202 | 3/2015 | |
| CN | 104798329 | 7/2015 | |
| KR | 101417084 | 8/2014 | |
| WO | 2012063190 | 5/2012 | |
| WO | 2013153269 | 10/2013 | |
| WO | WO-2016114696 A1 * | 7/2016 | ........... H04B 7/0456 |

OTHER PUBLICATIONS

PCT International Application No. PCT/KR2018/003171, Written Opinion of the International Searching Authority dated Jun. 20, 2018, 18 pages.

Samsung, "PRB bundling and precoding granularity in UL DMRS", 3GPP TSG RAN WG1 Meeting #88, R1-1702914, Feb. 2017, 3 pages.

Panasonic, "Precoded SRS for LTE-Advanced", 3GPP TSG RAN WG1 Meeting #56, R1-090689, Feb. 2009, 2 pages.

European Patent Office Application Serial No. 18766658.1, Search Report dated Oct. 9, 2020, 11 pages.

Japan Patent Office Application No. 2019-548296, Office Action dated Nov. 10, 2020, 2 pages.

LG Electronics, "Discussion on diversity transmission for UL", R1-1702448, 3GPP TSG RAN WG1 Meeting#88, Feb. 2017, 3 pages.

Samsung, "DMRS-based spatial multiplexing for UL NR MIMO", R1-1700897, 3GPP TSG RAN WG1 NR Ad-Hoc, Jan. 2017, 3 pages.

Samsung, "CSI acquisition for UL NR MIMO", R1-1700909, 3GPP TSG RAN WG1 NR Ad-Hoc, Jan. 2017, 3 pages.

* cited by examiner (a) Control-plane protocol stack (b) User-plane protocol stack

US 11,032,046 B2

METHOD FOR APPLYING PRECODER ON BASIS OF RESOURCE BUNDLING IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2018/003171, filed on Mar. 19, 2018, which claims the benefit of U.S. Provisional Application No. 62/473,239, filed on Mar. 17, 2017, and 62/474,079, filed on Mar. 21, 2017, the contents of which are all hereby incorporated by reference herein in their entireties.

TECHNICAL FIELD

The present invention relates to a wireless communication system and, more particularly, to a method of applying a precoder based on resource bundling in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Based on the above-described discussion, the present invention proposes a method of applying a precoder based on resource bundling in a wireless communication system and an apparatus therefor.

The objects that can be achieved with the present invention are not limited to what has been particularly described hereinabove and other objects not described herein will be more clearly understood by persons skilled in the art from the following detailed description.

Technical Solution

According to an aspect of the present invention, provided herein is a method of transmitting an uplink signal by a user equipment (UE) in a wireless communication system, including transmitting a plurality of precoded reference signals to which precoder cycling patterns are applied in a predetermined resource unit to a base station (BS); receiving information indicating one of the plural precoded reference signals from the BS; and transmitting an uplink data signal and an uplink demodulation reference signal to the BS, using a precoder cycling pattern applied to the indicated precoded reference signal.

In another aspect of the present invention, provided herein is a user equipment (UE) in a wireless communication system, including a wireless communication module; and a processor connected to the wireless communication module and configured to transmit a plurality of precoded reference signals to which precoder cycling patterns are applied in a predetermined resource unit to a base station (BS), receive information indicating one of the plural precoded reference signals from the BS, and transmit an uplink data signal and an uplink demodulation reference signal to the BS, using a precoder cycling pattern applied to the indicated precoded reference signal.

The precoder cycling patterns applied to the plural precoded reference signals may be defined as a combination of a first precoder for each of the plural precoded reference signals and second precoders applied commonly to the plural precoded reference signals and cyclically applied in the predetermined resource unit.

The UE may determine the first precoder for each of the plural precoded reference signals using a downlink reference signal received from the BS.

The precoder cycling patterns applied to the plural precoded reference signals may precode the precoded reference signals in different directions in a horizontal domain and may be defined to cover all horizontal directions.

The UE may receive information about the predetermined resource unit from the BS.

Advantageous Effects

According to an embodiment of the present invention, a precoder based on resource bundling can be efficiently applied in a wireless communication system, particularly, in uplink reference signal transmission.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. Moreover, although the present specification describes an embodiment of the present invention with reference to FDD system, this is just exemplary. And, the embodiments of the present invention can be applied to H-FDD or TDD system by being easily modified.

Figure 1:
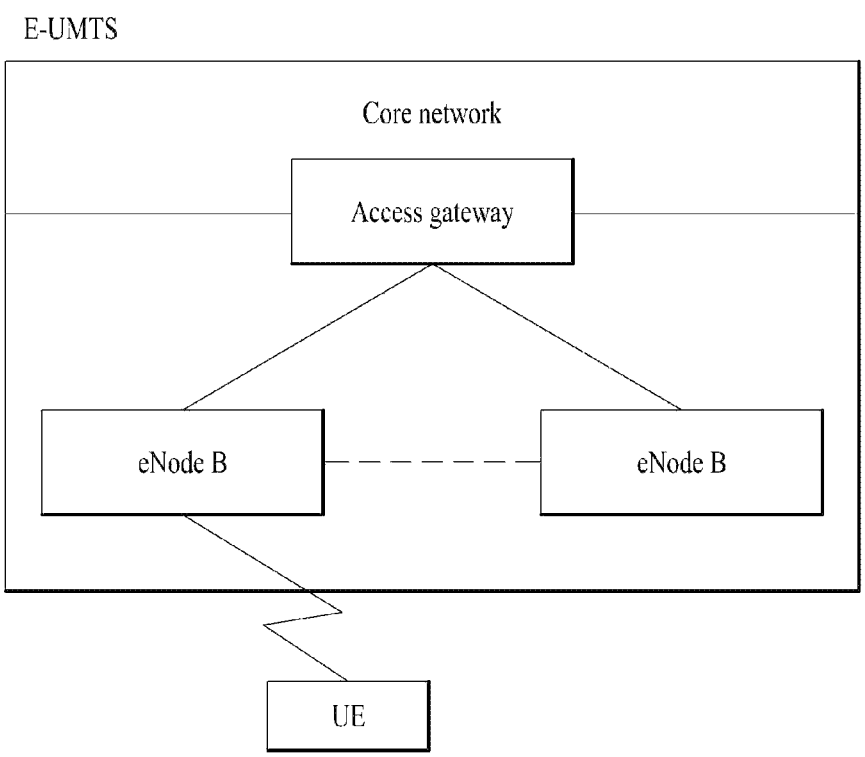
FIG. 1 is a diagram schematically illustrating a network structure of an E-UMTS as an exemplary radio communication system.
Figure 2:
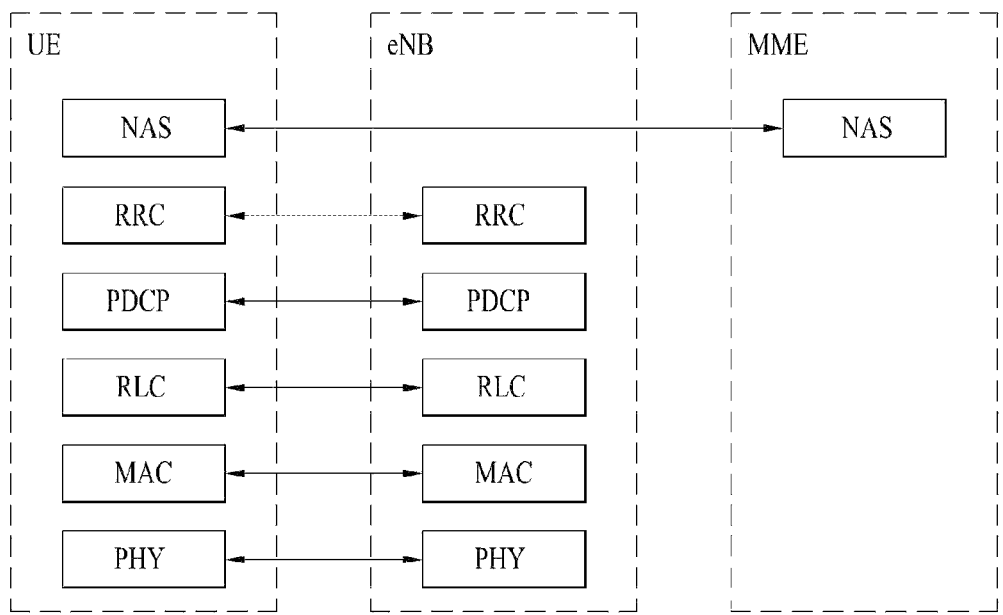
FIG. 2 is a diagram illustrating structures of a control plane and a user plane of a radio interface protocol between a UE and an E-UTRAN based on the 3GPP radio access network specification.
Figure 2:
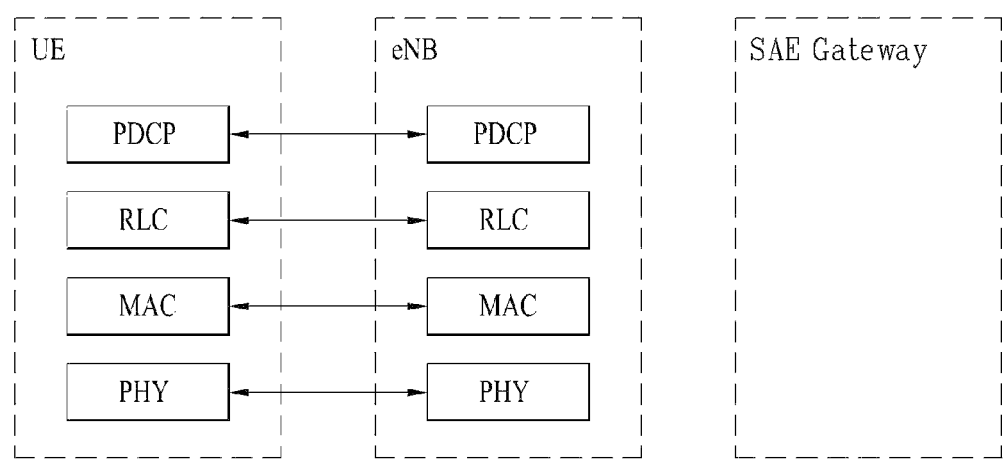

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel Data is transmitted between the MAC layer and the physical layer via the transmission channel Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer.

A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
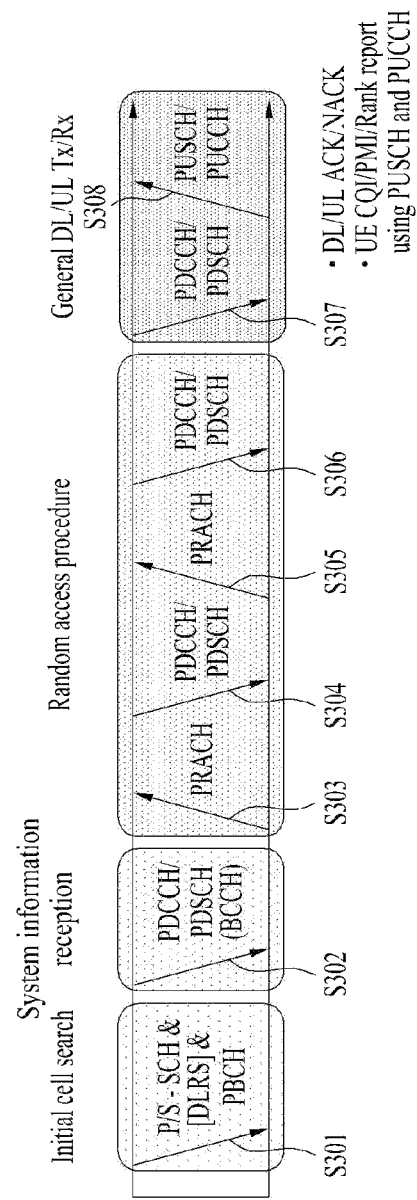
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
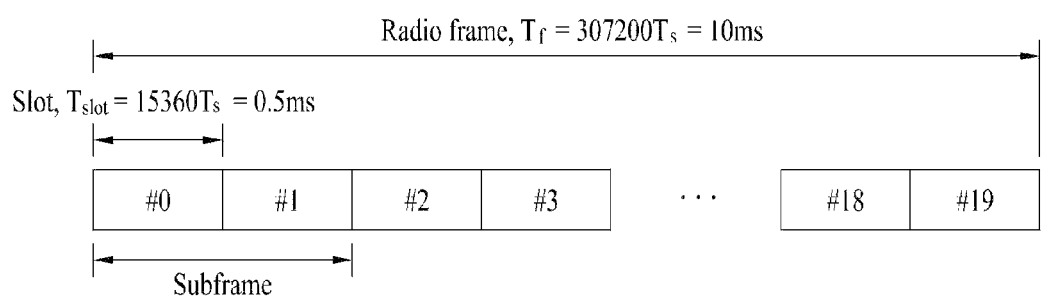
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1415 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
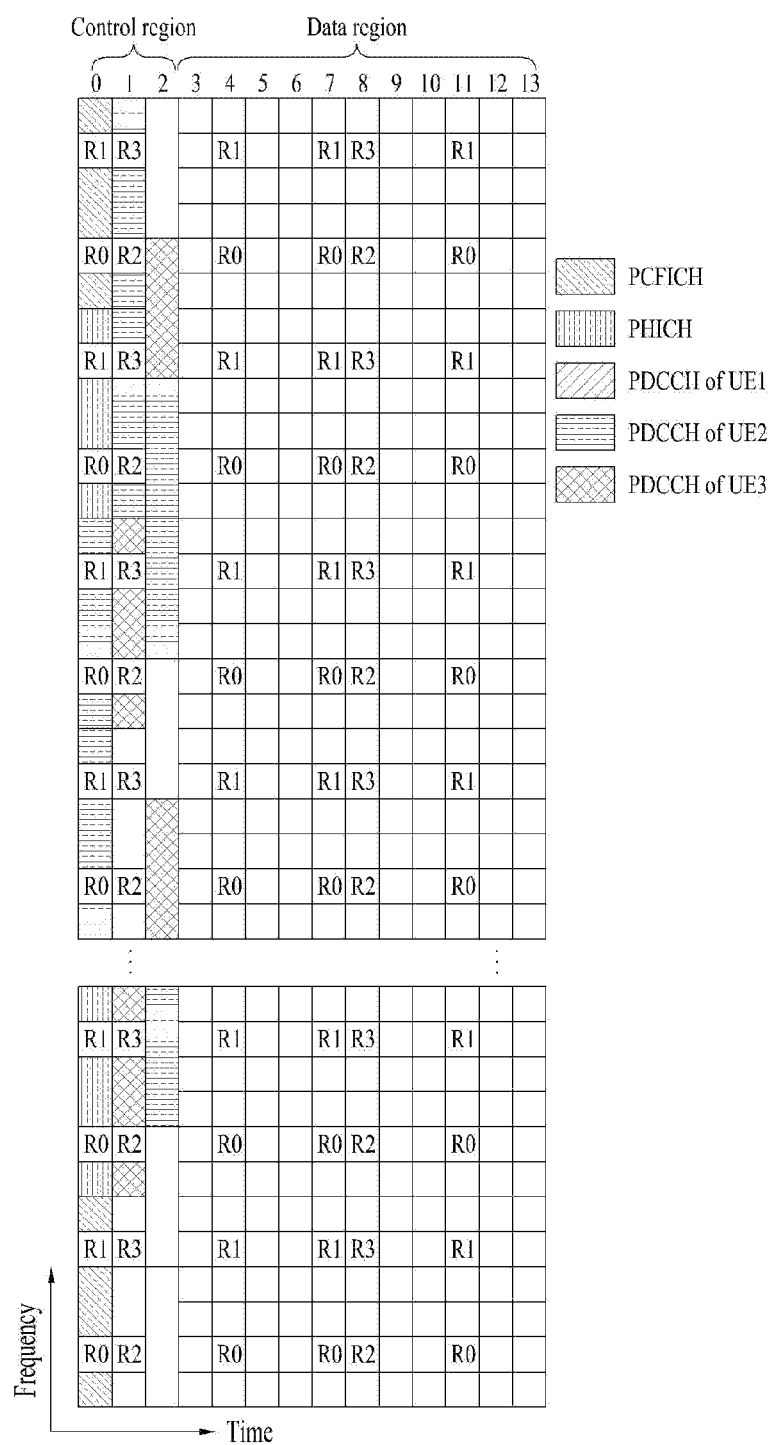
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPS K). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
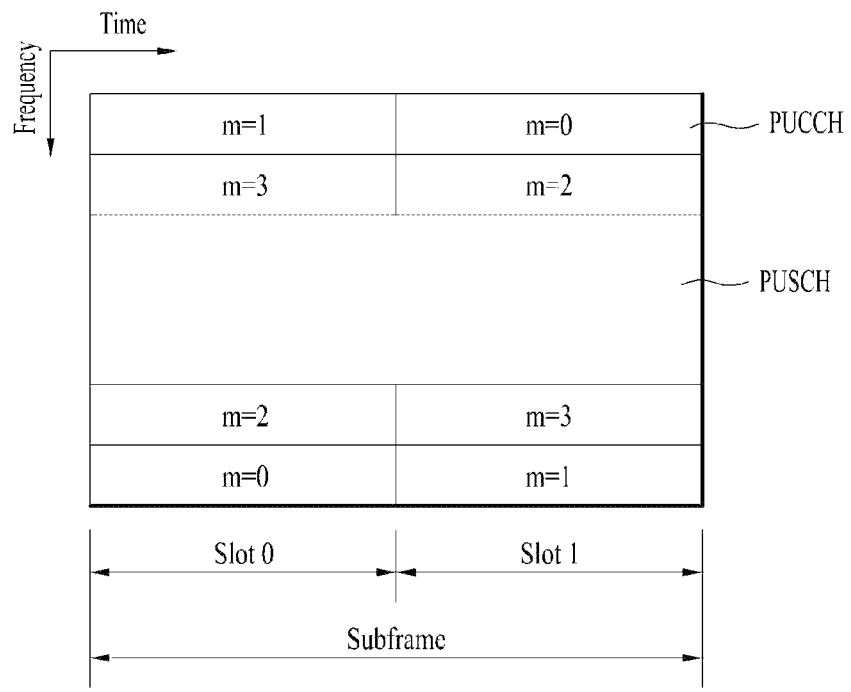
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

In addition, time on which a sounding reference signal (SRS) may be transmitted in one subframe is a duration in which a symbol which is located at the last portion in one subframe in the time domain is present and the SRS is transmitted through a data transmission band in the frequency domain. SRSs of multiple UEs transmitted on the last symbol in the same subframe are distinguishable according to frequency positions.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
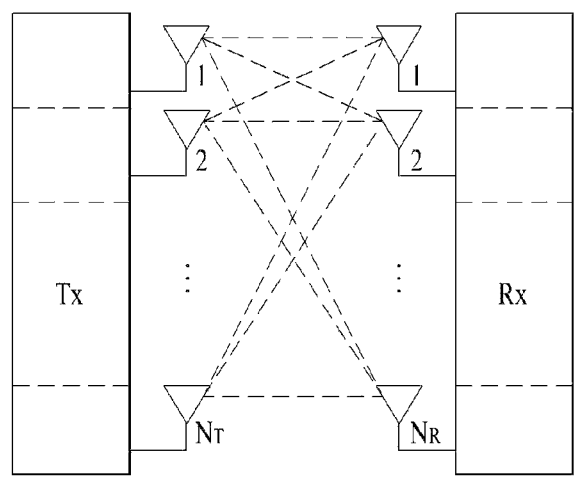
FIG. 7 is a diagram illustrating the configuration of a general MIMO communication system.

The configuration of a general MIMO communication system is shown in FIG. 7.

A transmitting end is equipped with NT transmission (Tx) antennas and a receiving end is equipped with NR reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is Ro, a transfer rate using multiple antennas can be theoretically increased by the product of the maximum transfer rate Ro by a rate increment Ri. The rate increment Ri is represented by the following equation 1 where Ri is the smaller of NT and NR.

$$R_i = \min(N_T, N_R)$$ [Equation 1]

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that NT Tx antennas and NR Rx antennas are present. In the case of a transmission signal, a maximum number of transmittable pieces of information is NT under the condition that NT Tx antennas are used, so that transmission information can be represented by a vector represented by the following equation 2:

$$S = [S_1, S_2, \ldots, S_{N_T}]^T$$ [Equation 2]

Meanwhile, individual transmission information pieces $S_1, S_2, \ldots, S_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

The transmission power-controlled transmission information vector $\hat{S}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

NT transmission signals $x_1, x_2, \ldots, x_{N_T}$ to be actually transmitted may be configured by multiplying the transmission power-controlled information vector $\hat{S}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

[Equation 5]

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_t} \end{bmatrix} = W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \qquad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \qquad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Now, a description of a Channel Status Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI).

First, RI refers to rank information of a channel, as described above, indicating the number of streams that the UE can receive on the same frequency-time resource. Since RI is determined by long-term fading of the channel, RI is typically fed back at a longer periodicity than PMI or CQI. Second, PMI indicates a precoding matrix index of the eNB, preferred by the UE, based on a metric such as a signal-to-interference-plus-noise ratio (SINR), as a value reflecting spatial characteristics of the channel Lastly, CQI indicates a received SINR that is obtainable typically when the eNB uses PMI, as a value representing strength of the channel.

According to the present invention, RS ports are configured by applying a transmission precoder to an RS used for channel measurement of the eNB or the UE and the precoder is applied through circular cycling with a specific pattern or is applied while being changed to a random precoder, according to a specific time-frequency resource unit (i.e., a time-frequency resource bundle unit, PRG', or a UL precoding resource block group ((PRG)). Particularly, the present invention may be applied both to a DL RS and a UL RS and may be typically applied to a DL CSI-RS and a UL SRS. An RS applied to open-loop MIMO transmission or semi-open-loop MIMO transmission may be used and the RS may also be used for close-loop MIMO transmission.

Recently, a UL precoded SRS or a DL precoded CSI-RS, to which beamforming is applied, is under discussion and an operation scheme in which a plurality of precoded RSs is configured and the UE or the eNB selectively indicates a specific precoded RS is under consideration. Particularly, a precoded RS of the present invention relates to an RS having a purpose (e.g., purpose used for CSI/MCS configuration and scheduling) different from a demodulation reference signal (DM-RS) used for signal demodulation.

The concept of a time-frequency resource bundle is applied to the precoded RS proposed in the present invention, so that a receiving end may assume that the same precoder is used within the bundled resources but may not assume that the same precoder is used between the bundled resources. Such a bundled resource unit (hereinafter, referred to as PRG') may be configured separately from a bundled resource unit (i.e., PRG) of the DM-RS used in a demodulation procedure to thus increase flexibility of a system operation or may be limited identically to a legacy PRG to thus simplify the system operation.

Alternatively, the bundled resource unit may be set to a multiple of the PRG considering that the precoded RS has lower density than the DM-RS, thereby increasing channel measurement performance. In contrast, a configuration may be limited such that a multiple of the bundled resource unit is the PRG.

Alternatively, PRG' may be determined based on the transmission bandwidth of the SRS, i.e., the number of RBs. For example, the size of PRG' may be decreased as the bandwidth is narrower to maintain the number of cycling beams applied to the SRS. If SRS hopping is configured, PRG' may be determined, according to the transmission bandwidth or the number of RBs, per hopping instance. Alternatively, even when SRS hopping is defined/configured, PRG' may be determined based on a total corresponding SRS transmission band (i.e., the number of RBs allocated for SRS transmission) and, in each hopping instance, PRG' may be configured to determine and transmit a precoder based on a bundled resource unit for bandwidth of a corresponding timing.

In the present invention, although an open-loop MIMO/semi-open-loop MIMO scheme is described under the assumption that beam cycling in which a beam is changed in a specific time-frequency resource unit is basically performed, the proposal of the present invention may be applied to random open-loop/semi-open-loop MIMO transmission instead of beam cycling. Beam cycling refers to applying PMIs which are present in a specific PMI set by cyclically changing the PMIs as a time-frequency resource varies. When there are a large number of time-frequency resources, all PMIs are applied and then the PMIs are cyclically applied again starting from the first PMI in a PMI set. Alternatively, a PMI set may not be configured and PMIs may be applied while randomly changing the PMIs as the time-frequency resource varies.

First Embodiment

In the first embodiment of the present invention, a precoded SRS usage method is described in which a different precoder is configured in a PRG' unit, i.e., the same precoder is applied within a PRG' resource.

1) First, a UL open-loop/semi-open-loop MIMO scheme using a UL precoded SRS will now be used.

By applying precoder bundling of the above-described PRG' unit to the SRS, the eNB may implicitly indicate a beam cycling pattern or a precoder to be used for UL open-loop/semi-open-loop MIMO to the UE. For example, N (precoded) SRSs (or SRS resources) are configured for the UE and the UE applies a different beam cyclic pattern or (semi-)open-loop MIMO scheme to each SRS (or SRS resource) and then transmits the SRSs.

The UE transmits a precoded SRS through beam cycling in a PRG' unit and transmits a plurality of precoded SRSs. Different beam cycling is applied to each precoded SRS. The eNB checks reception channels of multiple precoded SRSs, selects the best SRS, and informs the UE of the selected SRS through DCI. The eNB performs channel estimation in a PRG' unit and selects an SRS (or SRS resource) having the best channel measurement quality based on an effective channel to which both a channel and a precoder are applied although it is unknown which precoder is applied to each PRG'. Then, the eNB indicates the selected SRS (or SRS resource) through the DCI. Next, the UE performs UL data transmission using a precoder applied to the SRS indicated by the DCI.

For example, when SRS 1 and SRS 2 (or SRS resource 1 and SRS resource 2) are used, the UE cyclically applies PMI 1 to PMI 4 to SRS 1 in a PRG' unit PMI 5 to PMI 8 to SRS 2 in a PRG' unit and then transmits the SRSs. Next, when the eNB indicates SRS 1 through the DCI, i.e., a UL grant, the UE transmits data by cyclically applying PMI 1 to PMI 4 applied to SRS 1 in a PRG unit, which is a bundling unit of a DM-RS. The UE divides scheduled RBs in a PRG unit and cyclically applies PMI 1 to PMI 4 in a PRG unit. Then, the UE transmits the data and the DM-RS.

Meanwhile, the UE may autonomously determine a beam cycling pattern to be applied to each SRS. Alternatively, the eNB may designate the beam cycling pattern or help the UE autonomously determine the beam cycling pattern well.

First, when the UE autonomously determines the beam cycling pattern or the precoder of (semi-)open-loop MIMO, the UE estimates a UL RS from a DL RS using DL/UL reciprocity and autonomously determines the beam cycling pattern/precoder. For example, in a dual codebook structure including codebooks W1 and W2, the UE selects N best codebooks W1 and perform beam cycling or (semi-)open-loop MIMO by applying different best codebooks W1 to N respective SRSs. That is, independent codebook W1 is configured for each SRS and a cycling pattern of codebook W2 is identically configured for all SRSs. As a result, an independent cycling beam may be applied to each SRS.

Alternatively, a precoder using common W1 may be configured for SRSs but different precoders may be configured for respective SRSs by differently configuring W2. In this case, one of a beam selector part and a co-phase part constituting W2 may be differently configured for each SRS and the other one may be equally configured for each SRS.

However, since the co-phase part has a stronger random tendency, it is desirable that only the beam selector part be differently configured.

Even in an environment in which DL/UL reciprocity is unavailable, the UE applies beam cycling or (semi-)open-loop MIMO to N SRSs in a different direction. For example, a beam applied to each SRS is configured to cover directions of different 360/N degrees in a vertical domain. Specifically, when 4 SRSs are present, directions of precoders applied to the respective SRSs are configured to cover 0 to 90 degrees, 90 to 180 degrees, 180 to 270 degrees, and 270 to 360 degrees with respect to the respective SRSs.

If the eNB indicates a beam cycling pattern, the eNB indicates codebook subset restriction (CSR) to be used for each SRS and the UE applies beam cycling or (semi-)open-loop MIMO using limited PMIs to CSR of each SRS. Alternatively, the eNB designates W1 to be used for each SRS. When performing beam cycling/semi-open-loop MIMO of each SRS, the UE uses designated W1 and generates beam cycling by cycling W2 or performs semi-open-loop MIMO using designated W1.

When the eNB helps the UE autonomously determine beam cycling (or open-loop/semi-open-loop MIMO), the eNB may restrictively designate one or plural precoders that the UE should use for beam cycling (or open-loop/semi-open-loop MIMO) among all precoders in a codebook. The UE may freely determine a beam within a restricted PMI set to perform beam cycling (or semi-open-loop MIMO). Restriction of the precoders may be differently configured per SRS and a different PMI may be applied to each SRS for transmission. As an alternative method, simply, precoder set restriction, i.e., CSR, may be commonly applied to each SRS. In this case, the UE performs semi-open-loop or beam cycling using a different precoder per SRS.

Additionally, the eNB may inform the UE of the number of layers that the UE should transmit, i.e., rank information, in addition to SRS selection information. If the selected SRS is configured by N ports and M ranks are indicated, a condition of N>=M should be satisfied and precoders applied to the first port to the M-th port among the N ports are used for transmission by mapping the precoders to the first layer to the M-th layer in one-to-one correspondence.

Alternatively, the eNB may inform the UE of only the SRS selection information without the rank information. For example, SRS resource 1 to SRS resource 4 are configured, SRS resource 1 is configured by one port, SRS resource 2 is configured by two ports, SRS resource 3 is configured by 3 ports, and SRS resource 4 is configured by four ports. Therefore, if the eNB selects an SRS resource, a rank is automatically determined by the number of ports of the SRS. That is, if SRS 2 is selected and indicated, the eNB and the UE operate to transmit a PUSCH by rank 2 corresponding to the number of ports of SRS 2.

2) A closed-loop MIMO scheme using a UL precoded SRS will now be described.

When a UL closed-loop MIMO scheme is used, the eNB needs to indicate, to the UE through the DCI, which precoder should be used to transmit UL data. When the eNB allocates frequency selective scheduling, i.e., multiple RBs, to one UE and indicates each PMI that should be used in a subband unit, a DCI payload size increases. If the UL precoded SRS is used, such control channel overhead is reduced.

The UE transmits the UL SRS using different precoders in a PRG' unit. As described above, the eNB may restrict, through CSR, a precoder to be used by the UE or the eNB may pre-indicate W1 and the UE may freely select and apply W2. Alternatively, the UE may autonomously determine the precoder. Next, the UE performs beam cycling in a PRG' unit and transmits the SRS by applying a different beam.

The eNB measures a channel in a PRG' unit after receiving the SRS and indicates, to the UE through the DCI, information about PRG' to which a precoder that should be used by the UE to transmit the UL data is applied.

Specifically, the eNB indicates a specific PRG' resource and the UE transmits data using a precoder which has been used for SRS transmission on the indicated PRG' resource. If a plurality of SRSs is configured for the UE, the eNB indicates a specific SRS through an SRS indicator (SRI) and also indicates the PRG' resource. If a resource is a broad band, indication of the PRG' resource may occupy a large DCI payload. Therefore, the eNB should be aware of a resource unit which is newly started after beam cycling of the UE is ended and this information may be indicated by the eNB to the UE or may be reported by the UE to the eNB to share the information.

For example, in a 20-RB system, when PRG'=1 RB and PMIs of PMI={1,2,3,4} are sequentially applied through circular cycling, the eNB and the UE share information indicating that a resource unit in which PMIs are cyclically applied once is 4 PRG' (i.e., 4 RBs). In this case, since the eNB recognizes that the same PMI has been applied to RB 0, RB 4, RB 8, RB 12, and RB 16, if the eNB prefers the corresponding PMI, the eNB indicates RB 0, which is a representative RB (e.g., an RB of the lowest index). Consequently, since the eNB only needs to indicate one of RB 0 to RB 3, it is possible to transmit information using a total of a 2-bit payload.

Alternatively, the concept of a subresource may be introduced to perform the same operation. That is, a band in which one SRS is transmitted is divided into multiple subresources and a precoded SRS to which a different PMI is applied is transmitted on each subresource. Specifically, subresource 1 to subresource 4 are present and subresource 1 is configured as RB 0, RB 4, RB 8, RB 12, and RB 16. Subresource 2 is configured as RB 1, RB 5, RB 9, RB 13, and RB 17 and subresource 3 is configured as RB 2, RB 6, RB 10, RB 14, and RB 18. Finally, subresource 4 is configured as RB 3, RB 7, RB 11, RB 15, and RB 19. In this situation, RBs constituting each subresource are uniformly spread on all resources and subresources are combined in a comb type to constitute the all resources. The eNB indicates subresources through a field of a 2-bit size and informs the UE of which PMI should be used for data transmission.

As an alternative specific method, the eNB indicates scheduling information (resource allocation) through the DCI after receiving the SRS. Upon transmitting data on a corresponding scheduled resource, the UE uses a precoder which has been used for SRS transmission on the scheduled resource. That is, a PMI to be used for data transmission may be implicitly determined only by resource allocation information in the DCI without additional information about a PMI.

Second Embodiment

In the second embodiment of the present invention, a precoded SRS usage method is described in which a different precoder is configured in an antenna port unit, i.e., a different precoder is applied to each antenna port.

A) First, the case in which the UL open-loop/semi-open-loop MIMO scheme is applied will now be described.

If beam cycling of an RS is applied, density of RSs is lowered and accuracy of channel measurement may be reduced. That is, an SRS and a CSI-RS are generally transmitted in all bands, whereas an effective channel is randomly changed between PRB' resources when a precoder is changed in a PRG' unit, so that accuracy of channel measurement is lowered.

Accordingly, beam cycling may not be applied to a resource on which an SRS is transmitted and may be applied to an SRS port. For example, when SRS port 1 to SRS port 4 are configured, PMIs are applied to each port in order of PMI 1 to PMI 4. The UE transmits multiple SRSs to which different PMIs are applied and the eNB selects the best SRS and indicates the selected SRS to the UE.

The eNB recognizes that a different PMI has been applied to each port of each SRS and selects an optimal SRS upon receiving data while cycling an SRS port in a PRG unit. For example, when it is assumed that rank-1 UL data is transmitted, the eNB estimates channels h1 to h4 of SRS port 1 to SRS port 4 with respect to 4-port SRS 1 and performs scheduling under the assumption that data is received while changing a channel estimated in a PRG unit. That is, the eNB determines an MCS and resource allocation when receiving data under the assumption that channels h1, h2, h3, h4, h1 . . . are applied to PRG 1, PRG 2, PRG 3, PRG 4, PRG 5 . . . , respectively.

In rank-2, it is assumed that two layers are transmitted through two SRS ports in each PRG. Both the eNB and the UE should be aware of two SRS ports to be assumed in each PRG. For example, it is assumed that data is transmitted through concatenated channels [h1 h2], [h3 h4], [h1 h2], [h3 h4], [h1 h2] . . . for PRG 1, PRG 2, PRG 3, PRG 4, PRG 5 . . . , respectively. In addition, it is assumed that the first layer is transmitted through the first channel vector of the concatenated channels and the second layer is transmitted through the second channel vector of the concatenated channels.

Since the eNB and the UE share a port cycling pattern for a rank, if the eNB informs the UE of rank information together with an SRI, through the DCI, i.e., a UL grant, the UE may determine a beam cycling pattern based on a corresponding port cyclic pattern. For example, when SRI=1 and rank=1, the UE transmits data by cycling precoder 1 to precoder 4 which have been used by the UE through each port of SRS 1 (4 ports). That is, the UE transmits data and a DM-RS by cyclically applying precoder 1 to precoder 4 in a PRG unit.

B) Next, the case in which a UL closed-loop MIMO scheme is applied will be described.

The eNB may indicate an SRS port (together with an SRI if multiple SRSs are configured) instead of a PMI of closed-loop MIMO and the UE may transmit data using a beam/PMI applied to the port. Multiple ports constituting one SRS may be code-division-multiplexed (CDMed) or frequency-division-multiplexed (FDMed).

For example, when multiple ports are FDMed, port 1 to port 4 in a 4-port SRS are cyclically FDMed to PRG' (or specific resource unit) 1 to PRG' (or specific resource unit) 4 and ports starting from port 1 are FDMed again to PRG's starting from PRG' 5 through circular mapping. Alternatively, in an 8-port SRS, ports of (1, 2), (3, 4), (5, 6), and (7, 8) are cyclically FDMed to PRG' (or specific resource unit) 1 to PRG' (or specific resource unit) 4 and ports starting from ports (1, 2) are FDMed to PRGs' starting from PRG'S through circular mapping. In this case, since precoders are differently applied in a PRG' unit, the same effect as an effect of the first embodiment occurs and the UE and the eNB may be operated similarly to the first embodiment.

Third Embodiment

In the third embodiment of the present invention, a precoded SRS usage method is described in which a different precoder is configured one each SRS resource.

In the first embodiment, the method of transmitting a precoder while changing the precoder in a PRG' unit on one SRS (or SRS resource) has been described. However, the same operation may be performed by configuring multiple SRSs (or SRS resources) without introducing PRG'.

For example, in the first embodiment, PMI={1,2,3,4} is cycled in a PRG' unit, whereas, in the third embodiment, four SRSs are used and SRS 1 to SRS 4 are precoded to PMI 1 to PMI 4. However, SRS 1 is transmitted on PRG' resources 0, 4, 8, 12, . . . , SRS 2 is transmitted on PRG' resources 1, 5, 9, 13, . . . , SRS 3 is transmitted on PRG' resources 2, 6, 10, 14, . . . , and SRS 4 is transmitted on PRG' resources 3, 7, 11, 15, . . . , so that the four SRSs serve as one SRS in the first embodiment. In this case, the eNB and the UE should recognize that SRS 1 to SRS 4 are one SRS group and each SRS group has a different beam cycling pattern. For example, SRS group 1 and SRS group 2 are configured and each SRS group includes four SRSs. The eNB or the UE indicates or feeds back one SRS group to feed back CSI when a data transmitting end cycles a precoder used for an SRS belonging to the SRS group or transmit data by performing cycling using the precoder.

Fourth Embodiment

If multiple antenna panels are installed in the transmitting end, a channel state of each panel may differ. For example, multiple antenna panels may be installed in an antenna of the eNB. In this case, when a DL (semi-)open-loop MIMO transmission scheme is used, the UE may feed back information indicating that the UE desires to transmit DL data through a specific panel to the eNB. The specific panel may be limited to one panel having the best reception quality. In this case, the UE may also feed back CSI (i.e., RI, CQI, or a part of PMI such as W1) under the assumption that transmission using the (semi-)open-loop MIMO scheme is performed with respect to a DL channel of the panel. Next, the eNB performs open-loop MIMO transmission with respect to the corresponding panel.

Alternatively, the specific panel may indicate two or more subsets among all panels. In this case, the UE feeds back CSI (i.e., RI, CQI, or a part of PMI such as W1) under the assumption that transmission using the (semi-)open-loop MIMO scheme is performed with respect to DL channels of the panels. That is, the UE calculates CSI while cycling the panels in a specific time-frequency resource unit. For example, when panel 1 and panel 2 are selected, the UE calculates the CSI when alternately using panel 1 on RB 0, panel 2 on RB 1, and again panel 1 on RB 2. Upon transmitting DL data, the eNB transmits the data while cycling a panel per RB in the same manner as the method used for CSI calculation. That is, the eNB performs open-loop MIMO transmission through panel cycling. If panel selection is performed within a codebook, the above-described feedback information may be panel selection information within the codebook.

Even on UL, the eNB informs the UE (or the UE informs the eNB) of information about a panel to be used for UL data transmission. Even during SRS transmission, the UE transmits an SRS while cycling a panel in each time-frequency resource unit and the eNB measures a channel from this SRS and determines an MCS.

Fifth Embodiment

The eNB may indicate a part of CSI-RS ports to the UE and the UE feeds back CSI using only the partial ports. For example, the eNB indicates 4 specific ports corresponding to a subset of an 8-port CSI-RS to the UE and the UE calculates and feeds back CSI upon transmitting data through semi-open-loop MIMO for the 4 ports.

Alternatively, all ports are divided into disjoint partial ports and semi-open-loop transmission is performed with respect to respective partial ports. In this case, each port group is used for transmission by being cycled in a specific time-frequency resource unit. For example, an 8-port CSI-RS is divided into 4 2-port groups and then is used for data transmission by being cycled 2 ports by 2 ports in an RB unit. That is, ports (0,1), ports (2,3), ports (4,5), ports (6,7), ports (0,1), . . . , are cyclically used for RB 1, RB 2, RB 3, RB 4, RB 5 . . . . During CSI calculation, the UE should also calculate CSI under the assumption that port groups are cycled.

Sixth Embodiment

The first to third embodiments have described a method supporting open-loop MIMO or closed-loop MIMO transmission by diversifying a digital precoder through an RS. In the sixth embodiment, an example of application of the present invention is described in terms of beam management.

For example, in the first embodiment, when a different analog beam is cycled for transmission in a PRG' unit per UL/DL beam management RS (hereinafter, referred to as a BRS and may be a DL CSI-RS or a UL SRS), the eNB may select a PRG' resource and indicate the selected resource to the UE to indicate that the UE should use an (analog) beam which has been used in corresponding PRG' of a corresponding BRS. If multiple BRSs are configured, the eNB may also provide BRS indication information.

If the UL BRS is the SRS, the eNB indicates the SRS, and PRG' or one or partial beams among multiple beams applied to the indicated SRS and the UE uses a corresponding beam as a transmission beam.

If the DL BRS is the CSI-RS, the UE indicates the CSI-RS, and PRG' or one or partial beams among multiple beams applied to the indicated CSI-RS and the eNB uses a corresponding beam as a transmission beam. Alternatively, one beam is applied to a DL CSI-RS in a PRG' unit without applying different precoders and the UE receives the DL CSI-RS by differently applying a reception beam in a PRG' unit. The UE selects a reception beam having good channel quality among multiple Rx beams configured in a PRG' unit and uses the selected beam as the reception beam upon receiving DL data (or PDCCH).

Alternatively, the UE selects a PRG' resource and feeds back the selected resource to the eNB to indicate that the UE prefer an (analog) beam which has been used for corresponding PRG' of a corresponding BRS. If multiple BRSs are configured, the UE may also provide BRS indication information.

Unlike precoder indication information in terms of UL precoding, this beam indication information may not be indicated together with a UL grant and may be transmitted together with a DL grant or a method of transmitting the beam indication information together with the DL grant or through a dedicated DCI format or a dedicated RNTI may be used. Beam reporting information may be transmitted as separate reporting from CSI reporting. Beam reporting information may not be transmitted together with a CQI and/or an RI and, instead, may be transmitted together with reference signals received power (RSRP) corresponding to layer 1. Unlike DL/UL precoder indication, since a reception/transmission beam of the UE may be maintained for a relatively long time, a method of indicating or reporting the information using an L2/L3 layer message needs to be considered.

Figure 8:
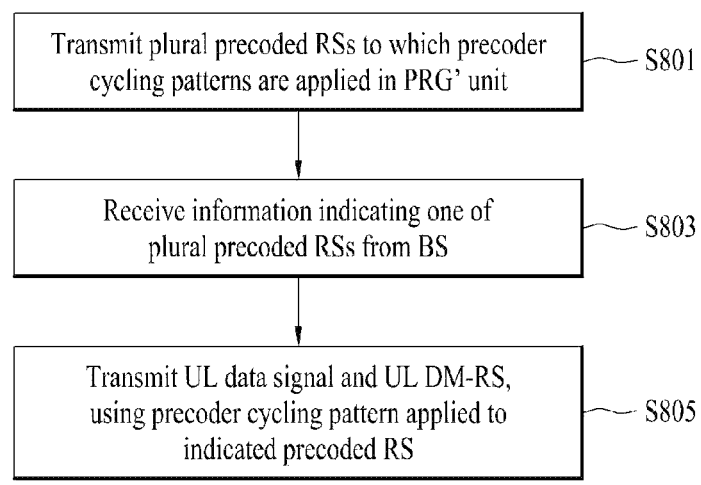
FIG. 8 is a flowchart illustrating a communication method using a UL precoded SRS according to an embodiment of the present invention.

FIG. 8 is a flowchart illustrating a communication method using a UL precoded SRS according to an embodiment of the present invention.

Referring to FIG. 8, in step 801, a UE transmits a plurality of precoded RSs to which precoder cycling patterns are applied in a predetermined resource unit, i.e., in a PRG' unit, to an eNB. Herein, the precoder cycling patterns applied to the plural precoded RSs are defined as a combination of a first precoder for each of the plural precoded reference signals and second precoders applied commonly to the plural precoded reference signals and cyclically applied in the predetermined resource unit. Particularly, in a TDD system, the first precoder for each of the plural precoded RSs may be determined using a DL RS received from the eNB.

More desirably, the precoder cycling patterns applied to the plural precoded RSs precode the precoded RSs in different directions in a horizontal domain and may be defined to cover all horizontal directions.

Next, in step 803, the UE receives information indicating one of the plural precoded RSs from the eNB and, in step 805, the UE transmits a UL data signal and a UL DM-RS, using a precoder cycling pattern applied to the indicated precoded RS.

Additionally, the UE may previously receive information about the predetermined resource unit from the eNB.

Figure 9:
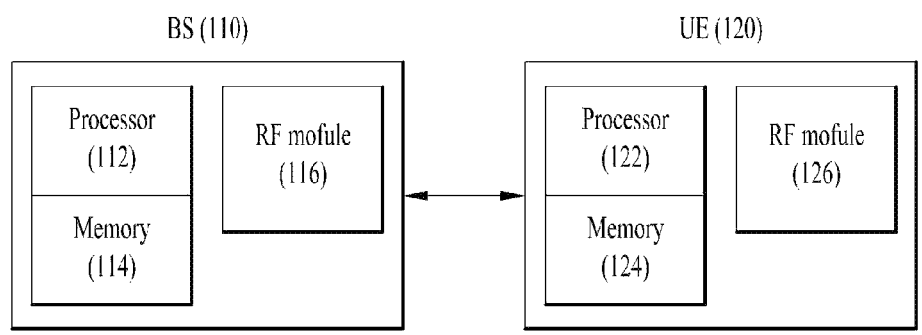
FIG. 9 is a diagram illustrating a BS and a UE applicable to an embodiment of the present invention.

FIG. 9 illustrates a BS and a UE applicable to an embodiment of the present invention.

Referring to FIG. 9, a wireless communication system includes a BS 110 and a UE 120. The BS 110 includes a processor 112, a memory 114, and a radio frequency (RF) unit 116. The processor 112 may be configured to implement the procedures and/or methods proposed in the present invention. The memory 114 is connected to the processor 112 and stores a variety of information related to the operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed in the present invention. The memory 124 is connected to the processor 122 and stores a variety of information related to the operation of the processor 122. The RF unit 126 is connected to the processor 122 and transmits and/or receives radio signals. The BS 110 and/or the UE 120 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

The memory unit may be located at the interior or exterior of the processor and may exchange data with the processor by various pre-known means.

It will be apparent to those skilled in the art that various modifications and variations can be made therein without departing from the spirit and scope of the invention. Therefore, the detailed description should not be interpreted restrictively in all aspects but considered as exemplary. Thus, it is intended that the present invention covers the modifications and variations of this invention that come within the scope of the appended claims and their equivalents.

INDUSTRIAL APPLICABILITY

While the above-described method of applying a precoder based on resource bundling in a wireless communication system and the apparatus therefor have been described focusing upon an example applied to a 3GPP LTE system, the present invention is applicable to various wireless communication systems in addition to the 3GPP LTE system.

The invention claimed is:
1. A method of transmitting an uplink signal by a user equipment (UE) in a wireless communication system, the method comprising:
receiving, from a base station (BS), information on a sounding reference signal (SRS) resource unit among predetermined SRS resource units, wherein each of the predetermined SRS resource units corresponds to different analog beams;

transmitting, to the BS, plural precoded SRSs to which precoder cycling patterns are applied per the SRS resource unit, wherein the plural precoded SRSs are transmitted with each of reference signals received powers (RSRPs) corresponding to the plural precoded SRSs, and the plural precoded SRSs are transmitted without channel quality information (CQI) and a rank indicator (RI);

receiving, from the BS, information on a transmission analog beam and a reception analog beam through a downlink control information (DCI) format other than DCI formats used for an uplink grant and a downlink grant;

receiving, from the BS, information indicating one of the plural precoded SRSs through a DCI format used for an uplink grant based on the information on the transmission analog beam and the reception analog beam; and transmitting, to the BS, an uplink data signal and an uplink demodulation reference signal based on the uplink grant and based on a precoder cycling pattern applied to the indicated precoded SRS.

2. The method of claim 1, wherein the precoder cycling patterns applied to the plural precoded SRSs are defined as a combination of a first precoder for each of the plural precoded SRSs and second precoders applied commonly to the plural precoded SRSs, the second precoders cyclically applied per the SRS resource unit.

3. The method of claim 2, further comprising:

receiving a downlink reference signal from the B S; and determining the first precoder for each of the plural precoded SRSs based on the downlink reference signal.

4. The method of claim 1, wherein the precoder cycling patterns applied to the plural precoded SRSs precode the SRSs in different directions in a horizontal domain and are defined to cover all horizontal directions.

5. A user equipment (UE) in a wireless communication system, the UE comprising:

a wireless communication module; and a processor connected to the wireless communication module and configured to:

receive, from a base station (BS), information on a sounding reference signal (SRS) resource unit among predetermined SRS resource units, wherein each of the predetermined SRS resource units corresponds to different analog beams, transmit, to the BS, plural precoded SRSs to which precoder cycling patterns are applied per the SRS resource unit, wherein the plural precoded SRSs are transmitted with each of reference signals received powers (RSRPs) corresponding to the plural precoded SRSs, and the plural precoded SRSs are transmitted without channel quality information (CQI) and a rank indicator (RI), receive, from the BS, information on a transmission analog beam and a reception analog beam through a downlink control information (DCI) format other than DCI formats used for an uplink grant and a downlink grant, receive, from the BS, information indicating one of the plural precoded SRSs through a DCI format used for an uplink grant based on the information on the transmission analog beam and the reception analog beam, and transmit, to the BS, an uplink data signal and an uplink demodulation reference signal based on the uplink grant and based on a precoder cycling pattern applied to the indicated precoded SRS.

6. The UE of claim 5, wherein the precoder cycling patterns applied to the plural precoded SRSs are defined as a combination of a first precoder for each of the plural precoded SRSs and second precoders applied commonly to the plural precoded SRSs, the second precoders cyclically applied per the SRS resource unit.

7. The UE of claim 6, wherein the processor is further configured to determine the first precoder for each of the plural precoded SRSs based on a downlink reference signal received from the BS.

8. The UE of claim 5, wherein the precoder cycling patterns applied to the plural precoded SRSs precode the SRSs in different directions in a horizontal domain and are defined to cover all horizontal directions.

* * * * *